United States Patent
Wang et al.

(10) Patent No.: US 9,685,004 B2
(45) Date of Patent: Jun. 20, 2017

(54) METHOD OF IMAGE PROCESSING FOR AN AUGMENTED REALITY APPLICATION

(71) Applicant: Apple Inc., Cupertino, CA (US)

(72) Inventors: Lejing Wang, Munich (DE); Selim BenHimane, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 14/430,162

(22) PCT Filed: Sep. 28, 2012

(86) PCT No.: PCT/EP2012/069247
§ 371 (c)(1),
(2) Date: Mar. 20, 2015

(87) PCT Pub. No.: WO2014/048497
PCT Pub. Date: Apr. 3, 2014

(65) Prior Publication Data
US 2015/0235424 A1    Aug. 20, 2015

(51) Int. Cl.
*G06T 19/00* (2011.01)
*G06T 7/00* (2017.01)

(52) U.S. Cl.
CPC .......... *G06T 19/006* (2013.01); *G06T 7/0042* (2013.01); *G06T 2207/10016* (2013.01); *G06T 2207/20004* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,166,744 A | 12/2000 | Jaszlics et al. | |
| 2012/0127284 A1* | 5/2012 | Bar-Zeev | G02B 27/017 348/53 |
| 2015/0029222 A1* | 1/2015 | Hofmann | G06K 9/00993 345/633 |

OTHER PUBLICATIONS

Kyrki, Ville, and Danica Kragic. "Tracking rigid objects using integration of model-based and model-free cues." Machine Vision and Applications 22.2 (2011): 323-335.*
"COMP 558 lecture 15." (2010). Retrieved from http://www.cim.mcgill.ca/~langer/558/15-HoughRANSAC.pdf on Aug. 3, 2016.*

(Continued)

*Primary Examiner* — Ryan D McCulley
(74) *Attorney, Agent, or Firm* — Blank Rome LLP

(57) ABSTRACT

An apparatus for and method of image processing in an augmented reality application is provided. The method includes the steps of: providing at least one image of a real environment; performing image processing in an augmented reality application with the at least one image employing visualization of overlaying digital information with visual impressions or the image of the real environment and employing vision-based processing or tracking; and adjusting at least one of a parameter and operating flow of the vision-based processing or tracking depending on at least one of the following: a usage of the image processing, a usage of the visualization, a visually perceivable property of the digital information or the real environment, a property of a display device employed in the visualization, or a manner in which a user is viewing the visualization.

20 Claims, 6 Drawing Sheets

(56) References Cited

OTHER PUBLICATIONS

Zulfiqar Hasan Khan et al., "Joint Feature Correspondences and Appearance Similarity for Robust Visual Object Tracking," IEEE Transactions on Information Forensics and Security, IEEE, Piscataway, NJ, US, vol. 5, No. 3, Sep. 1, 2010, pp. 591-606, ISSN: 1556-6013.

Aspiazu et al. "Remote Support for Maintenance Tasks by the Use of Augmented Reality". The ManuVAR.

Coelho et al. "OSGAR: A Scene Graph with Uncertain Transformations", Mixed and Augmented Reality, Nov. 2, 2004, pp. 6-15.

Feiner et al. "A Touring Machine: Prototyping 3d Mobile Augmented Reality Systems for Exploring the Urban Environment", Proc. 1st Int'l Symp. Wearable Comoputers, 1997, pp. 74-81.

Fischer et al. "Enhanced Visual Realism by Incorporating Camera Image Effects", Proceedings of the 5th IEEE and ACM International Symposium on Mixed and Augmented Reality, 2006.

Kato et al. "Marker Tracking and HMD Calibration for a Video-Based Augmented Reality Conferencing System", 2nd IEEE and ACM International Workshop on Augmented Reality, 1999.

Robertson et al. "An Evaluation of Graphical Context as a Means for Ameliorating the Effects of Registration Error", IEEE Transactions on Visualization and Computer Graphics vol. 15, No. 2, Mar. 1, 2009, p. 179.

Sanni Siltanen, "Theory and Applications of Marker-Based Augmented Reality", Espoo 2012, VTT Science 3.

Siltanen et al. "Augmented Interiors with Digital Camera Images", Proceedings of the 7th Australasian User Interface Conference, vol. 50, 2006, pp. 33-36.

Wang et al. "An Augmented Reality Application Framework for Complex Equipment Collaborative Maintenance", Sep. 11, 2011, Cooperative Design, Visualization, and Engineering, pp. 154-161.

Wang et al. "Floyd-Marshall All-Pair Shortest Path for Accurate Multi-Marker Calibration", IEEE, pp. 277-278.

* cited by examiner

METHOD OF IMAGE PROCESSING FOR AN AUGMENTED REALITY APPLICATION

This application is entitled to the benefit of, and incorporates by reference essential subject matter disclosed in PCT Application No. PCT/EP2012/069247 filed on Sep. 28, 2012.

BACKGROUND OF THE INVENTION

1. Technical Field

The present invention relates to a method of image processing in an augmented reality application, comprising the steps of providing at least one image of a real environment and performing image processing in an augmented reality application with the at least one image employing visualization of overlaying digital information with visual impressions or the image of the real environment and employing vision-based processing or tracking. The invention also relates to a computer program product comprising software code sections for performing the method.

2. Background Information

Augmented reality systems and applications present enhanced information of real environment by providing a visualization of overlaying digital information, particularly computer-generated virtual information, with visual impressions or an image of the real environment. The digital information can be any type of visually perceivable data such as objects, texts, drawings, videos, or any combination thereof. The real environment is captured, for example, with a camera held by a user or attached on a device held by a user. The digital information has to be superimposed with the real environment or a part of the real environment in the camera image at a right time, at a right place and in a right way in order to offer a satisfied visual perception to users.

The right time requires that the digital information should be superimposed with the real environment in the image when and only when it is required or necessary, for example, when a particular real object appears in the camera image (e.g., See Kato, H. and M. Billinghurst. Marker Tracking and HMD Calibration for a Video-based Augmented Reality Conferencing System. in 2nd IEEE and ACM International Workshop on Augmented Reality (IWAR 99). 1999. San Francisco, Calif.; referred to hereinafter as "Kato"), or when the camera is positioned at a particular geometrical location (e.g., See S. Feiner et al., "A Touring Machine: Prototyping 3D Mobile Augmented Reality Systems for Exploring the Urban Environment," Proc. 1st Int'l Symp. Wearable Computers (ISWC'97), IEEE CS Press, Los Alamitos, Calif., 1997, pp. 74-81).

The digital information should be superimposed with the real environment at desired pixel positions within the image, for example in a correct perspective way, i.e. adapted and derived from the real environment being viewed. In order to achieve this, the pose of the camera, i.e. orientation and position, with respect to the real environment or a part of it has to be known (e.g., See Kato). Vision is an indispensable component for computing the camera pose in augmented reality applications, as the camera image that captures the real environment can always be a means for camera pose estimation and\or real object detection. Various vision-based online tracking solutions have been developed to compute the pose of the camera for augmented reality applications; e.g., See Sanni Siltanen, Theory and applications of marker-based augmented reality. Espoo 2012. VTT Science 3; which may also be found at http://www.vtt.fi/inf/pdf/science/2012/S3.pdf; hereinafter referred to as "Siltanen").

The right way means that the digital information should be embedded into the real environment in the image or view of the real environment (for example, viewed by an optical see-through display device) depending on the purpose of an application. For augmented reality applications where virtual information is used to give instructions, draw users' attention, or support the understanding of 3D shapes and dimensions, the virtual information is preferred to be superimposed with real environment such that it is bright and indistinguishable from the real environment. Examples of such applications are augmented assembly and maintenance support; e.g., See Azpiazu, J., Siltanen, S., Multanen, P., Makiranta, A., Barrena, N., Diez, A., Agirre, J. & Smith, T. Remote support for maintenance tasks by the use of Augmented Reality: the ManuVAR. This visualization is so called non-photorealistic visualization. In contrast, photorealistic visualization is preferred in many applications where virtual information is visually indistinguishable from the real environment. Virtual interior design (e.g., See Sanni Siltanen and Charles Woodward. 2006. Augmented interiors with digital camera images. In Proceedings of the 7th Australasian User interface conference—Volume 50 (AUIC '06), Wayne Piekarski (Ed.), Vol. 50. Australian Computer Society, Inc., Darlinghurst, Australia, Australia, 33-36; hereinafter referred to as "Siltanen and Woodward") and augmented clothing are examples of such applications. For this, many solutions have been developed to have an enhanced visual realism by incorporating occlusion (e.g., See in Ivan J. Jaszlics, Sheila L. Jaszlics, U.S. Pat. No. 6,166,744, System for combining virtual images with real-world scenes; hereinafter referred to as "Jaszlics"), illumination (e.g., See Siltanen and Woodward), noise and motion blur in camera images (e.g., See Jan Fischer, Dirk Bartz, and Wolfgang Strasser. Enhanced visual realism by incorporating camera image effects. In Proceedings of the 5th IEEE and ACM International Symposium on Mixed and Augmented Reality (ISMAR '06). 2006; hereinafter referred to as "Fischer") into the visualization. A most recent survey of augmented reality technologies, including tracking, visualization, user interface, etc.; e.g., as presented in Siltanen.

Many visualization techniques for augmented reality applications have been developed to improve visualization of overlaying digital information with visual impressions or an image of the real environment, particularly the visual perception of the overlay of digital information and real environment. In order to have a photorealistic visualization, Siltanen and Woodward erases artificial markers that are used for camera pose estimation from images and introduces lighting and shadow effects to virtual objects. Fischer incorporates camera image effects, e.g. noise, motion blur, to virtual objects. Jaszlics detects the range data of real environment to generate a correct visual effect of the virtual information occluded by the part of real environment in the overlay image of the virtual information and the real environment.

The performance of vision-based tracking solutions is often quantified in terms of re-projection error or the result of similarity measure. The re-projection error corresponds to the pixel distance between a projected point of a real 3D point and a measured one in an image. The similarity measure computes the degree of difference between a transformed reference visual feature and a visual feature in a camera image. Common examples of image similarity measures include the sum-of-squared differences (SSD), cross-correlation, and mutual information. The result of a similarity is a real number. If the similarity measure is the sum-of-squared difference between two image patches, the smaller the similarity measure result is, the more similar the two visual features are. If the similarity measure is the zero normalized cross-correlation between two image patches, the bigger the similarity measure result is, the more similar the two visual features are. The proposed method according to the invention, as set out below, can use any of these techniques.

The parameters (including their values) and operating flow or workflow of the vision-based processing or tracking solutions are always configured such that the similarity measure and\or the re-projection error are minimized; e.g., See Wang, L.; Springer, M.; Heibel, T. H. & Navab, N. (2010), Floyd-Warshall all-pair shortest path for accurate multi-marker calibration., in 'ISMAR', IEEE, pp. 277-278. However, in augmented reality applications, the challenge is that none of a minimized similarity measure and a minimized re-projection error could indicate or guarantee a user satisfying overlay of digital information and real environment in a camera image or view of an optical see-through display device. Therefore, even when vision-based processing or tracking solutions are optimized in terms of the similarity measure and\or the re-projection error, the problem of user unsatisfied visualization often happens, such as jittering, virtual information misaligned with real environment, discontinuous display of virtual information.

Augmented reality authoring tools allow people, who have, e.g., no software development, image processing and computer vision background, to create powerful and flexible augmented reality applications in a simple and intuitive way. The authoring tools decouple the usage of the visualization and augmented reality application from the vision-based tracking, detection, or localization solutions. The users of the authoring tools have the knowledge of the usage of the visualization and the properties of the digital information to be overlaid or of the real environment. Only the reference object used for localizing the imaging sensor (camera) in the environment is considered when selecting the type and the parameters of the vision-based tracking algorithms. However, as discussed above, the augmented reality visualization could be disturbed even when the tracking solutions are optimized for the similarity measure and\or the re-projection error.

It would therefore be beneficial to provide a method of image processing in an augmented reality application which is capable to improve the performance and usability of augmented reality applications, particularly augmented reality authoring tools.

SUMMARY OF THE INVENTION

According to an aspect of the invention, there is provided a method of image processing in an augmented reality application, comprising the steps of providing at least one image of a real environment, performing image processing in an augmented reality application with the at least one image employing visualization of overlaying digital information with visual impressions or the image of the real environment and employing vision-based processing or tracking, and adjusting at least one of a parameter and operating flow of the vision-based processing or tracking depending on at least one of the following: a usage of the image processing, a usage of the visualization, a visually perceivable property of the digital information or the real environment, a property of a display device employed in the visualization, a manner in which a user is viewing the visualization.

Accordingly, the present invention is capable to improve the performance and usability of augmented reality applications, such as authoring tools. Particularly, the invention attends to the problem of user unsatisfied visualization of overlaying the virtual information or digital content to an image or view of a real environment in augmented reality or visual search applications that employ vision-based detection, localization or tracking solutions by adjusting parameters including their values and/or operating flow (workflow) of the vision-based processing or tracking according to the usage of the image processing or the visualization, according to a visually perceivable property of the digital information and/or the real environment, according to display devices, and/or according to the way of user viewing the visualization. For example, it is proposed to adapt the choice of the type and/or the parameters of the vision-based processing or tracking methods according to one or a set of additional input like the usage of the processing or tracking methods, the purpose of the visualization, model specifications of the digital information and/or the real environment, etc. None of the above described visualization techniques in the prior art takes the performance or the process of tracking solutions into consideration.

According to an embodiment, the vision-based processing or tracking involves a method for vision-based tracking, detection, localization, or classification.

For example, the parameter of the vision-based processing or tracking includes a variable having a value, a number of features in the image matched with a set of reference features, or a number of features in the image to be used for a pose estimation of a camera capturing the image.

The features are, but not limited to, intensities, gradients, edges, lines, segments, corners, descriptive features or any other kind of features, primitives, histograms, polarities or orientations.

According to an embodiment, the operating flow of the vision-based processing or tracking includes components and a combination of the components in the process of vision-based processing or tracking, wherein the components are sensors measuring a spatial property of an object or are mathematical methods used in computer vision or image processing field. For example, the spatial property is any property relating to or occupying a space, such as dimensionality, directionality, location, geometry. Preferably, the geometry describes at least one of the following attributes: shape, symmetry, planarity, geometrical size, density. The mathematical methods may include at least one of the following: a linear equation solver, a cost function, an optimization method.

According to an embodiment, the usage of the image processing includes at least one of the following: detecting or recognizing the real environment or a part of it, visual search, classification problems, estimating a pose of a capturing device capturing the image, tracking the real environment or a part of it.

According to a further embodiment, the usage of the visualization includes at least one of the following: delivering user's information associated to the real environment or a part of it, enhancing user's visual perception of the digital information and/or the real environment by superimposing the digital information to the real environment in a correct perspective.

According to an embodiment, the visually perceivable property of the digital information or the real environment includes at least one of the following: a spatial property, symmetry, behavior, color, type of the digital information or the real environment. For example, the behavior includes at least one of the following: static, moving, a way of moving, and/or the type includes at least one of the following: a text, a drawing, a video.

Particularly, the display device is a device displaying the overlay of the digital information and the real environment to a user, such as a monitor or an optical-see-through head mounted display.

According to an embodiment, the manner in which a user is viewing the visualization includes eye gazing or eye focusing. For example, only the part of the digital information which is in the user's focus may be overlaid precisely, whereas any other part of the digital information may be processed differently. For instance, eye gazing or eye focusing may be detected by an eye tracking sensor.

The invention may further include the step of employing in the vision-based processing or tracking a similarity measure of sum-of-squared differences, wherein the similarity measure is at least in part defined by a threshold value, and adjusting the threshold value.

For example, in the vision-based processing or tracking, at least one parameter describing a translation of the digital information is optimized, and at least one parameter describing a rotation around the digital information is not considered.

According to an embodiment, in a visualization of a digital information undertaking a certain animation that consists in a complex movement or trajectory of the digital information, a stable pose estimation of a camera capturing the image is not performed in the vision-based processing or tracking. For example, a number of feature correspondences employed to estimate the camera pose is decreased.

According to an embodiment, a threshold of a re-projection error of the digital information is adjusted according to a pixels-per-inch (PPI) parameter of the display device.

The method according to the invention is performed on a computer system, such as a stationary or mobile computer system, preferably on handheld devices as mentioned above.

The invention also relates to a computer program product adapted to be loaded into the internal memory of a digital computer system, and comprising software code sections by means of which the steps according to any of the above aspects and embodiments are performed when said product is running on said computer system.

BRIEF DESCRIPTION OF THE DRAWINGS

Further aspects, advantageous features and embodiments of the invention will be evident from the following description in connection with the drawings.

DETAILED DESCRIPTION OF THE INVENTION

Figure 1:
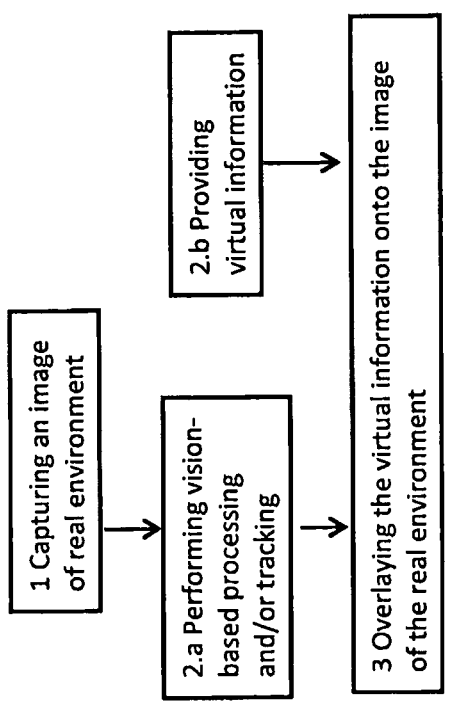
FIG. 1 shows a flowchart of an exemplary augmented reality visualization approach according to the state of art.

FIG. 1 shows a flowchart of an exemplary augmented reality visualization approach according to the state of art. In step 1 an image of real environment is captured by a capturing device, particularly a camera. In step 2.a, vision-based processing and/or tracking is performed on the captured image. The virtual information provided in step 2.b is overlaid onto the image of the real environment in step 3. In another application, the virtual information provided in step 2.b may be overlaid onto the view of the real environment which is provided by an optical-see-through display device, as commonly known in the art.

The visualization of overlaying digital (e.g., virtual) information onto the image of a real environment could be used for different purpose. Augmented reality visualization is often used to enhance user's visual perception by superimposing virtual information or digital content to the real environment in a correct perspective. For example, augmented interior design could superimpose a virtual sofa to the camera image of the real environment of the room in a correct perspective: e.g., as disclosed in Siltanen and Woodward. This application could visually support furniture arrangement in the room without having to move them physically. For this, an accurate pose of the camera with respect to the room is mandatory.

Figure 2:
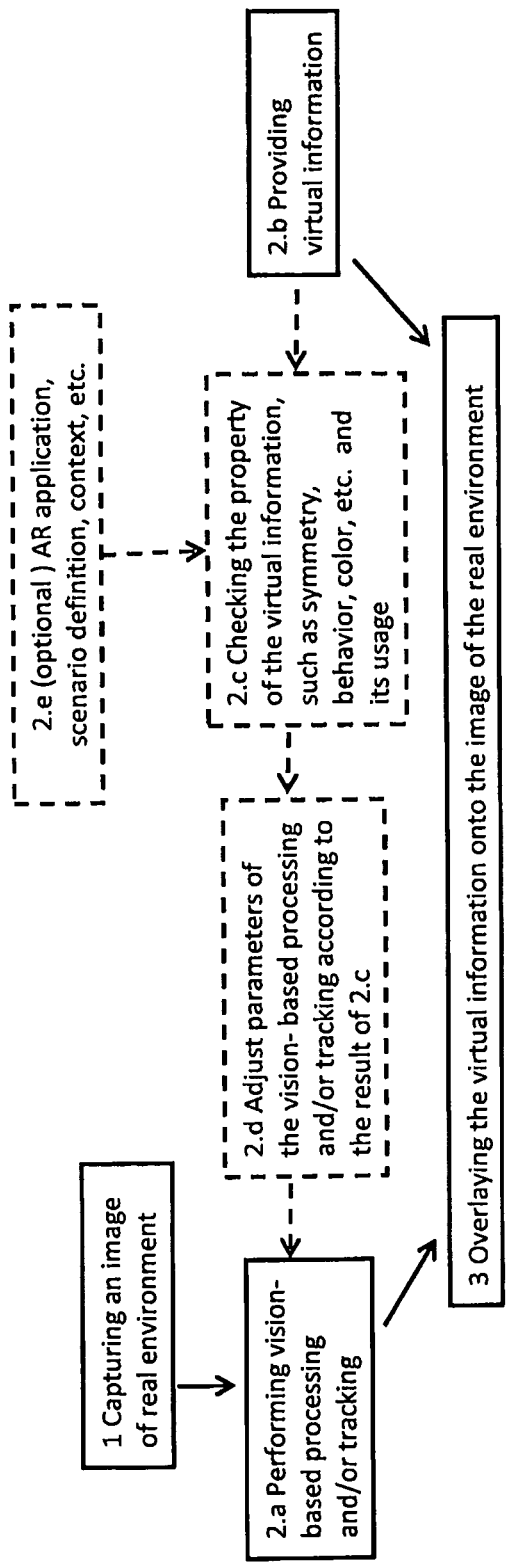
FIG. 2 shows a flowchart of a method according to an embodiment of the invention.

FIG. 2 shows a flowchart of a method of image processing according to an embodiment of the invention. The result of the step 2.b of preparing virtual information as the digital information to be overlaid will be an input to the step of performing vision-based processing or tracking in step 2.a through steps 2.c and 2.d. The step 2.b of providing the digital information describes the process of providing the digital information, its visual representation, its usage, and/or its visually perceivable property.

In addition to the steps described with reference to FIG. 1, in the present embodiment the property of the virtual information, such as symmetry, behavior, color, etc., and/or its usage may be checked or input by the user in step 2.c, wherein the method in response to this information configures or adjusts the processing or tracking of the image processing method in step 2.a accordingly. For example, in step 2.d parameters of the vision-based processing and/or tracking according to the result of 2.c are adjusted. In step 3, the virtual information is then overlaid onto the image of the real environment. In step 2.e, the type of augmented reality (AR) application, a scenario definition, a context, etc. may be provided to the method as additional input.

Figure 4:
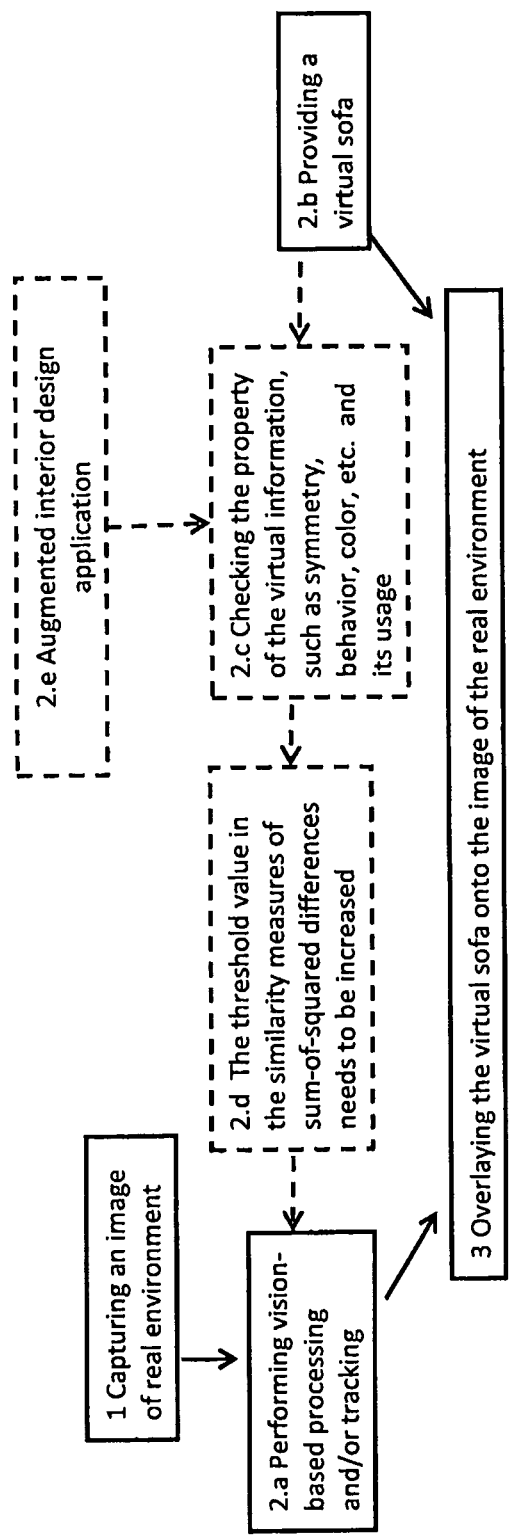
FIG. 4 shows a flowchart of a method according to an embodiment of the invention overlaying a virtual object (here sofa) onto the image of the real environment in augmented interior design application based on an embodiment of the present invention.

FIG. 4 shows a flowchart of a method according to an embodiment of the invention overlaying a virtual object (here a furniture, like a sofa) onto the image of the real environment in an augmented interior design application based on an embodiment of the present invention demonstrated in FIG. 2. The property of the virtual information, such as symmetry, behavior, color, etc., and/or its usage is checked in step 2.c, wherein the method in response to this information configures or adjusts the processing or tracking method accordingly. For example, in step 2.d the threshold value in the similarity measures of sum-of-squared differences is increased. In step 3, the virtual sofa is then overlaid onto the image of the real environment.

Augmented reality visualization can also be used to convey user's information associated to the real environment or a part of it, as long as the real environment or the part of it is seen by a pointing device, such as a camera. For example, when a piece of art in the real environment is seen by a camera image, texts regarding the art's history may be superimposed onto the image. In the example of an augmented film poster, a trailer will be played as soon or as long as the poster is seen by the camera image. In these situations, the virtual information or the digital content, i.e. the texts or trailer, often has to be superimposed on the image in a way that a human can easily read it. Therefore, in this application the exact pose of the camera with respect to the part of real environment, i.e. the art and poster, is often not necessary. In some applications, where the virtual information or digital content is displayed on the screen non-registered to the real environment, the pose of the camera is even not required at all. The example of such application is an augmented film poster where it plays a movie in a full screen mode or triggers displaying a web page on the screen when the poster is detected in the camera image. However, the high recognition rate of detecting the real environment or a part of it in the camera image becomes critical. A low recognition rate could result in the problems, such as false positive display of the virtual information, or positive false display of the virtual information.

Figure 5:
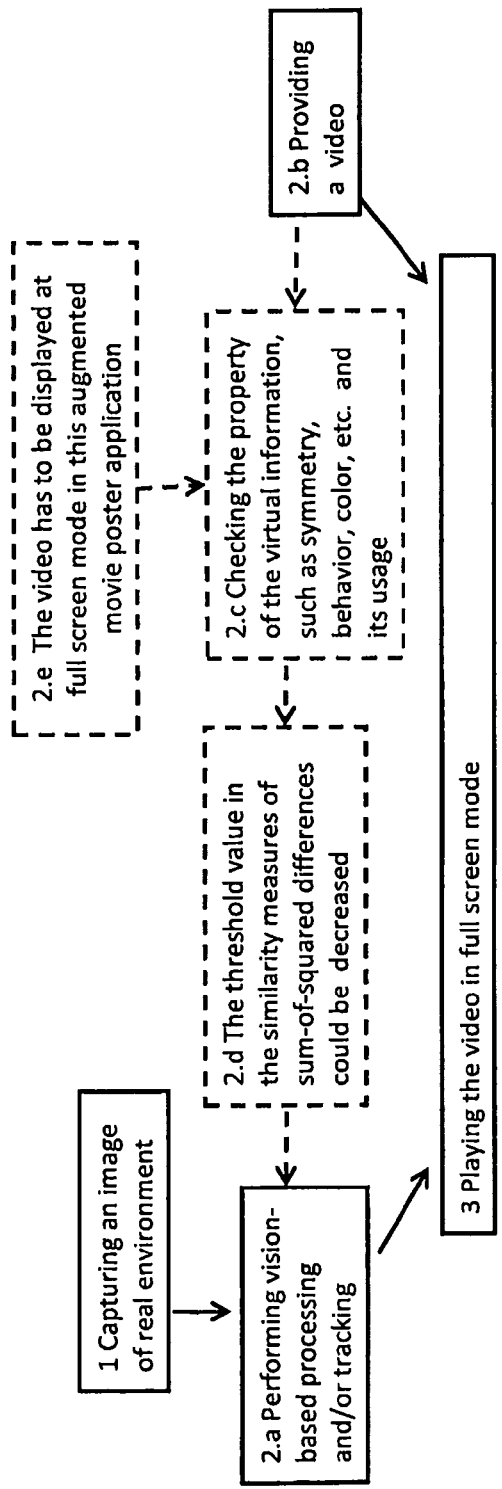
FIG. 5 shows a flowchart of a method according to an embodiment of the invention of playing a video in full screen mode in an augmented movie poster application based on an embodiment of the present invention.

FIG. 5 shows a flowchart according to an embodiment playing a video (as the digital information to be overlaid, step 2.b) in full screen mode in an augmented movie poster application based on the embodiment of the present invention demonstrated in FIG. 2. As a result of step 2.c, as described above, the threshold value in the similarity measures of sum-of-squared differences could be decreased. In step 3, the video is played in full screen mode.

Many vision-based tracking solutions cannot meet both of accurate pose estimation and high recognition rate. For example, a low threshold value in the similarity measures of sum-of-squared differences could result in an accurate estimated pose, but may lead to a low recognition rate. On the other side, a high threshold value for the similarity measures could result in an inaccurate estimated pose, but will lead to a high recognition rate. Therefore, adjusting the value of the threshold depending on the usage of the augmented reality visualization could lead to a user satisfying visualization.

The visual properties of the virtual information or the real environment are, but not limited to, the spatial property, behavior, and color.

When virtual information is a spherical object with homogenous texture on its surface, rotating the spherical object around the spherical center will not result in different visual perception to users. Translating the spherical object will result in different visual perception to users. Therefore, in the optimization process, parameters describing the translation of the virtual object have to be optimized, while parameters describing the rotations around the spherical do not need to be considered.

Figure 3:
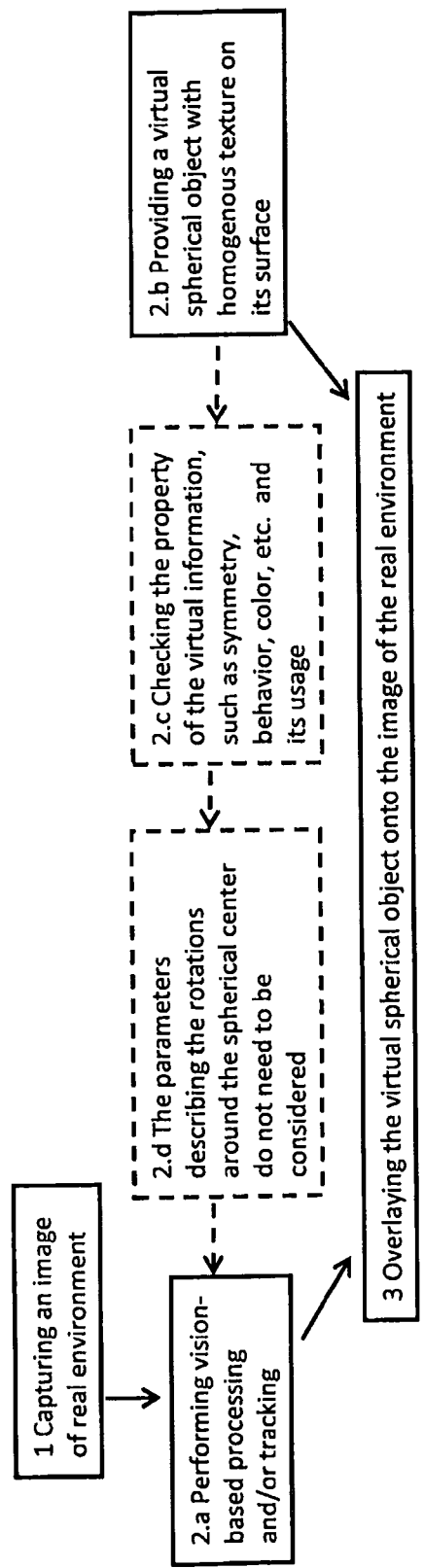
FIG. 3 shows a flowchart of a method according to an embodiment of the invention overlaying a virtual spherical object onto the image of the real environment based on an embodiment of the present invention.

FIG. 3 shows a flowchart according to an embodiment overlaying a virtual spherical object as the digital information onto the image of the real environment based on the embodiment of the present invention demonstrated in FIG. 2. In step 2.b, a virtual spherical object with homogenous texture on its surface is provided. As a result of step 2.c, as described before, parameters describing the rotations around the spherical center are adjusted in a way that they are not considered. In step 3, the virtual spherical object is overlaid onto the image of the real environment.

In order to have user satisfied visualization of augmented reality, parameters in the vision-based tracking solution may need to be adjusted according to the behavior of virtual information or the real environment. In the application of augmented interior design, the virtual information (e.g., sofa) is preferred to be stably superimposed without uttering onto the real room in the camera image. For this, a number of feature correspondences are often needed to have stable camera pose estimation. However, detecting or matching a large number of feature correspondences is challenging and often requires a manual initialization and processing time. It is suitable for offline applications, like superimposing virtual furniture onto a pre-capture image of the room, but not for online real-time applications.

In other applications, augmenting the environment with virtual objects undertaking a certain animation that consist in a complex movement or trajectory, such as a butterfly or a tree leaf falling down, do not require a stable camera pose estimation since the jitter of the camera pose estimation can be perceived by the user as being part of the animation of the virtual object. Another example is superimposing virtual information onto the part of a real environment in a camera image, in which the part of real environment is moved with respect to the camera. This often requires online real-time camera pose estimation without obvious lag, but the jitter of the camera pose estimation is not critical as it will be visually compensated by the movement of the part of the real environment. In these situations, fewer feature correspondences are preferred to estimate the camera pose for a real-time performance.

Figure 6:
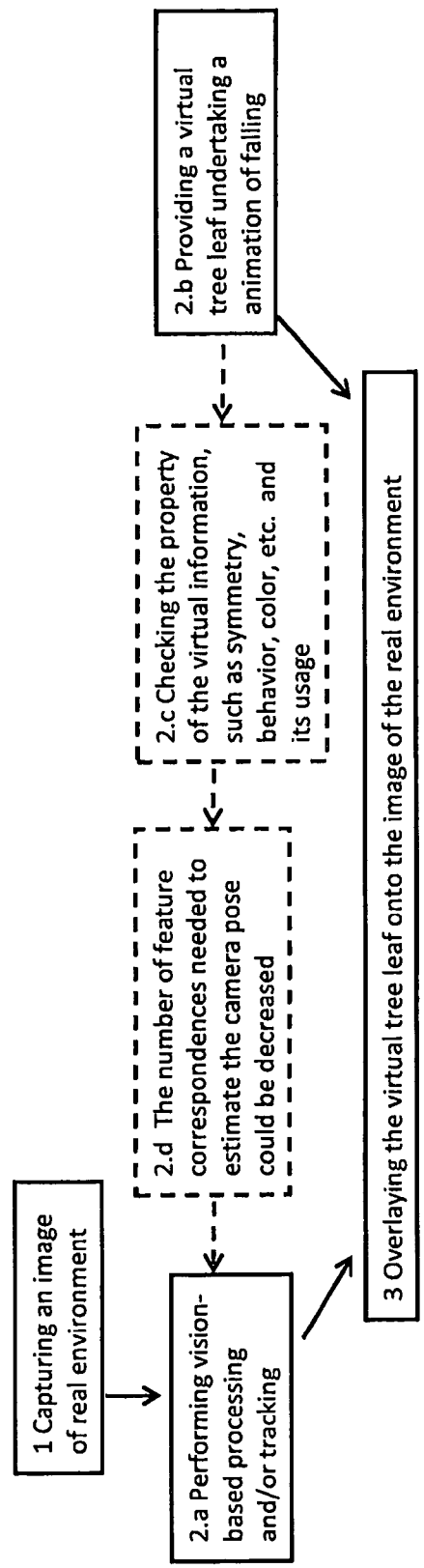
FIG. 6 shows a flowchart of a method according to an embodiment of the invention overlaying a virtual tree leaf onto the image of the real environment based on an embodiment of the present invention.

FIG. 6 shows a flowchart according to an embodiment overlaying a virtual tree leaf (provided in step 2.b as the digital information) onto the image of the real environment based on the embodiment of the present invention demonstrated in FIG. 2. As a result of step 2.c, as described above, in step 2.d the number of feature correspondences used to estimate the camera pose could be decreased. In step 3, the virtual tree leaf is overlaid onto the image of the real environment.

According to another embodiment, parameters in the vision-based processing or tracking may be adjusted according to the display devices used in the visualization for an optimal and user satisfying augmented reality visualization. One pixel in a monitor having 1 pixels-per-inch (PPI) is one inch, while one pixel in a monitor having 1000 PPI is $\frac{1}{1000}$ inch. One-pixel misalignment between the digital information to be overlaid and the real environment or a part of it in the image is more visually obvious to the human eye when it is displayed on a monitor with low PPI than a monitor with high PPI. Therefore, the threshold of the projection error may be adjusted according to the PPI parameter of the display device to have user satisfying visual perception of the augmented reality visualization.

The present invention thus discloses various embodiments of a method of image processing to remove potential visualization problems of overlaying digital information and real environment in augmented reality applications by adjusting parameters (including their values) and/or the operating flow (or workflow) of vision-based processing or tracking solutions according to the usage of the image processing or the visualization, according to visually perceivable property of the virtual information or the real environment, according to display devices, and/or according to the way of user viewing the visualization.

Particularly, the potential visualization problems are undesired visually perceivable effects, such as uttering of the digital information, misalignment between the digital information and the real environment or a part of it, discontinuous display of the digital information, false positive display of the digital information, or positive false display of the digital information.

Potential vision-based tracking solutions are, but are not limited to, methods or systems for tracking, detection or classification based on visual information, like 2D or 3D images that could be captured or generated by cameras or spatial scanners.

The parameter of a vision-based tracking solution may be a variable having a value, such as a threshold for an acceptable result of similarity measure or re-projection error, the number of features matched with a set of reference features or the number of features needed for camera pose estimation.

The value of the parameter could be any data type, such as integer, boolean, binary, real number, char, string, symbol.

The operating flow or workflow of the vision-based processing or tracking may include components and a combination of components in the process of vision-based tracking. The components are, but not limited to, sensors measuring a spatial property of an object or mathematical methods used in computer vision and image processing field. The spatial property may be any property relating to or occupying a space, such as dimensionality, directionality, location, geometry. Geometry may describe the following attributes, but not limited to, shape, symmetry, planarity, geometrical size, and density. The mathematical methods may include, but not limited to, linear equation solver, cost function, and optimization method. A cost function is a formula that reaches a maximum or minimum as visual features are brought into alignment in the field of computer vision and image processing. A common example of cost function is a similarity measure formula. An optimization method finds optimal values for the arguments of a cost function such that the function reaches a maximum or minimum by systematically choosing values of arguments from within an allowed set. Examples of an optimization method are Newton's method and the Levenberg-Marquardt algorithm.

The usage of the image processing may include, but is not limited to, detecting or recognizing the real environment or a part of it, visual search, classification problems, estimating the pose of an image capturing device, and/or tracking the real environment or a part of it.

The usage of the visualization may include, but is not limited to, delivering user's information associated to the real environment or a part of it, and/or enhancing user's visual perception by superimposing virtual information or digital content to the real environment in a correct perspective.

The visual properties of the digital information or the real environment are, but are not limited to, a spatial property, behavior, color and/or type. Behavior may include, but is not limited to, static (in the sense of remaining stationary), moving, and the way of moving.

The type of the digital information as described herein may include, but is not limited to, text, drawings, and videos.

The display devices as described herein are the devices displaying the overlay of the digital information and the real environment to a user, such as monitors (e.g., LCD monitors), optical-see-through displays (e.g., optical-see-through head mounted displays), etc.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A method of image processing in an augmented reality application, comprising:
   receiving, by the augmented reality application, an image of a real environment, the application being executed by one or more processors;
   performing image processing in the augmented reality application using the image, the image processing employing (i) a visualization of digital information overlaid onto one or more of the image and the real environment, and (ii) a vision-based processing or tracking technique, wherein the visualization is presented using a display device, and wherein a threshold of a re-projection error of the digital information is adjusted according to a pixels-per-inch (PPI) parameter of the display device; and
   adjusting one or more of a parameter and an operating flow of the vision-based processing or tracking technique.

2. The method according to claim 1, wherein the vision-based processing or tracking technique comprises vision-based tracking, detection, localization, or classification.

3. The method according to claim 1, wherein the parameter of the vision-based processing or tracking technique includes one or more of:
   a variable having a value,
   a number of features in the image matched with a set of reference features, and
   a number of features in the image to be used for a pose estimation of a camera capturing the image.

4. The method according to claim 1, wherein the operating flow of the vision-based processing or tracking technique includes a plurality of components, wherein at least one combination of the components is employed in the vision-based processing or tracking technique, and wherein the plurality of components comprises one or more of:
   one or more sensors measuring a spatial property of an object in the image or the real environment, and
   one or more mathematical methods used in computer vision or image processing.

5. The method according to claim 4, wherein, when the plurality of components comprises the one or more sensors, the object comprises a space in one or more of the image and the real environment and the spatial property is a property relating to the space.

6. The method according to claim 5, wherein the property relating to the space comprises a geometry relating to the space, and the geometry describes one or more of:
   a shape relating to the space,
   a symmetry relating to the space,
   a planarity relating to the space,
   a geometrical size relating to the space, and
   a density relating to the space.

7. The method according to claim 4, wherein, when the plurality of components comprises the one or more mathematical methods, the one or more mathematical methods include one or more of:
   a linear equation solver,
   a cost function, and
   an optimization method.

8. The method according to claim 1, wherein the display device comprises a device displaying one or more of the digital information and the real environment to the user such that the user can visually perceive the real environment through the device.

9. The method according to claim 1, further comprising:
quantifying a performance of the vision-based processing or tracking technique based on a similarity measure of sum-of-squared differences, wherein the similarity measure is defined, at least in part, by a similarity threshold value; and
adjusting the similarity threshold value.

10. The method according to claim 1, wherein, when the digital information includes a spherical object, the vision-based processing or tracking technique includes optimizing at least one parameter describing a translation of the spherical object, and not considering at least one parameter describing a rotation of the spherical object.

11. The method according to claim 1, wherein the visualization includes an animation of the digital information, and wherein, when the animation of the digital information includes a movement of the digital information, the vision-based processing or tracking technique does not include a stable pose estimation of a camera capturing the image.

12. The method according to claim 11, wherein a number of feature correspondences employed to estimate the camera pose is decreased.

13. The method according to claim 1, wherein adjusting one or more of a parameter and an operating flow of the vision-based processing or tracking technique is based on one or more of:
a usage of the image processing;
a usage of the visualization;
a visually perceivable property of one or more of the digital information and the real environment;
a property of the display device employed in the visualization; and
a manner in which a user is viewing the visualization.

14. The method according to claim 13, wherein, when the adjustment of one or more of the parameter and the operating flow is based, at least in part, on the usage of the image processing, the usage of the image processing includes one or more of:
detecting at least one part of the real environment,
performing a visual search of at least one part of the image or the real environment,
detecting classification problems associated with the image or the real environment,
estimating a pose of a capturing device capturing the image, or
tracking at least one part of the real environment.

15. The method according to claim 13, wherein, when the adjustment of one or more of the parameter and the operating flow is based, at least in part, on the usage of the visualization, the usage of the visualization includes one or more of:
delivering information to the user that is associated with at least one part of the real environment; and
enhancing the user's visual perception of one or more of the digital information and the real environment by superimposing the digital information onto the real environment in a correct perspective.

16. The method according to claim 13, wherein, when the adjustment of one or more of the parameter and the operating flow is based, at least in part, on the visually perceivable property, the visually perceivable property includes one or more of:
a spatial property associated with one or more of the digital information and the real environment,
a symmetry associated with one or more of the digital information and the real environment,
a behavior associated with one or more of the digital information and the real environment,
a color associated with one or more of the digital information and the real environment,
a type of the digital information, and
a type of the real environment.

17. The method according to claim 16, wherein, when the visually perceivable property includes the behavior, the behavior comprises data describing a position or a change in the position of at least one part of the digital information or the real environment, and wherein, when the visually perceivable property includes the type of digital information, the type of digital information includes one or more of a text, a drawing, and a video.

18. The method according to claim 13, wherein the manner in which the user is viewing the visualization comprises one or more of eye gazing and eye focusing.

19. A non-transitory computer readable medium comprising instructions for image processing in an augmented reality application, which when executed by one or more processors, causes the one or more processors to:
receive an image of a real environment;
perform image processing in the augmented reality application using the image, the application being executed by the one or more processors, and the image processing employing (i) a visualization of digital information overlaid onto one or more of the image and the real environment, and (ii) a vision-based processing or tracking technique, wherein the visualization is presented using a display device, and wherein a threshold of a re-projection error of the digital information is adjusted according to a pixels-per-inch (PPI) parameter of the display device; and
adjust one or more of a parameter and an operating flow of the vision-based processing or tracking technique.

20. A system for image processing in an augmented reality application, comprising:
memory storing data, the data including one or more computer-readable instructions;
a display device coupled to the memory; and
one or more processors coupled to the display device and the memory, the one or more processors being configured to execute the computer-readable instructions to:
receive an image of a real environment;
perform image processing in the augmented reality application using the image, the application being executed by the one or more processors, and the image processing employing (i) a visualization of digital information overlaid onto one or more of the image and the real environment, and (ii) a vision-based processing or tracking technique, wherein the visualization is presented using the display device, and wherein a threshold of a re-projection error of the digital information is adjusted according to a pixels-per-inch (PPI) parameter of the display device; and
adjust one or more of a parameter and an operating flow of the vision-based processing or tracking technique, wherein the adjustment of one or more of the parameter and the operating flow is based on one or more of:
a usage of the image processing;
a usage of the visualization;

a visually perceivable property of one or more of the digital information and the real environment;
a property of the display device employed in the visualization; and
a manner in which a user is viewing the visualization.

* * * * *